United States Patent
Kunisada et al.

(10) Patent No.: US 12,202,412 B2
(45) Date of Patent: Jan. 21, 2025

(54) SUPPORT STRUCTURE FOR ON-VEHICLE HIGH VOLTAGE COMPONENT

(71) Applicant: TOYOTA JIDOSHA KABUSHIKI KAISHA, Toyota (JP)

(72) Inventors: Masato Kunisada, Nagoya (JP); Takashi Tagaito, Toyota (JP); Motoyuki Tanaka, Toyota (JP); Seiji Hayashi, Toyota (JP); Kenta Kamiya, Nagakute-shi (JP); Kohta Kondoh, Nagoya (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 0 days.

(21) Appl. No.: 18/135,260

(22) Filed: Apr. 17, 2023

(65) Prior Publication Data

US 2023/0339410 A1 Oct. 26, 2023

(30) Foreign Application Priority Data

Apr. 22, 2022 (JP) .................. 2022-070729

(51) Int. Cl.
  *B60R 11/00* (2006.01)
  *B60L 1/00* (2006.01)
  *B60R 16/03* (2006.01)

(52) U.S. Cl.
  CPC ............. *B60R 11/00* (2013.01); *B60L 1/00* (2013.01); *B60R 2011/0029* (2013.01); *B60R 16/03* (2013.01)

(58) Field of Classification Search
  CPC ..... B60R 2011/0029; B60R 2011/0001; B60R 2011/0003; B60R 2011/0007; B60R 2011/0012; B60R 11/00
  USPC ....... 248/548, 676, 677, 671, 678, 680, 160, 248/163.1, 163.2, 174, 176.1, 503, 503.1, 248/505, 205.1; 180/68.5
  See application file for complete search history.

(56) References Cited

U.S. PATENT DOCUMENTS

| | | | | |
|---|---|---|---|---|
| 6,811,197 B1* | 11/2004 | Grabowski | ............... | B60R 7/04 180/68.5 |
| 7,048,321 B2* | 5/2006 | Bandoh | ............... | B60R 16/0239 180/68.5 |

(Continued)

FOREIGN PATENT DOCUMENTS

| JP | 2004-268779 A | 9/2004 |
|---|---|---|
| JP | 2005-001655 A | 1/2005 |

(Continued)

*Primary Examiner* — Christopher Garft
*Assistant Examiner* — Michael McDuffie
(74) *Attorney, Agent, or Firm* — Dinsmore & Shohl LLP

(57) ABSTRACT

A support structure for supporting a flat inverter located between seats aligned along the vehicle width direction is provided. A bracket supports the inverter in a horizontal position above a floor tunnel of a floor between the seats in a passenger compartment such that it is spaced apart from the floor tunnel. The bracket has a pair of rear leg portions aligned along the vehicle width direction. Middle parts of the pair of rear leg portions are formed so as to be easily bent outward or inward in the vehicle width direction. When a load is applied to the bracket due to movement of the seats during a side impact on the vehicle, the pair of rear leg portions bend, and the horizontal position of the inverter is disrupted.

1 Claim, 4 Drawing Sheets

(56) References Cited

U.S. PATENT DOCUMENTS

| | | | | |
|---|---|---|---|---|
| 8,016,063 B2* | 9/2011 | Tsuchiya | .................. | B60K 1/04 |
| | | | | 180/68.5 |
| 8,042,637 B2* | 10/2011 | Nagata | ..................... | B60K 1/04 |
| | | | | 180/68.5 |
| 8,118,125 B2* | 2/2012 | Suzuki | ..................... | B60K 1/04 |
| | | | | 180/68.5 |
| 8,376,074 B2* | 2/2013 | Yoda | .................... | B60L 3/0007 |
| | | | | 180/68.5 |
| 8,397,853 B2* | 3/2013 | Stefani | ................... | B60L 58/27 |
| | | | | 180/68.5 |
| 9,118,094 B2* | 8/2015 | Tsujimura | ............ | H01M 10/613 |
| 9,281,505 B2* | 3/2016 | Hihara | ................... | B62D 25/20 |
| 9,287,595 B2* | 3/2016 | Fujii | .................... | H01M 50/249 |
| 9,444,082 B2* | 9/2016 | Tsujimura | ............... | B60L 58/21 |
| 10,220,670 B2* | 3/2019 | Koyama | ................. | B60N 3/048 |
| 10,245,933 B2* | 4/2019 | Ikeuchi | ................... | B60L 50/64 |
| 10,399,425 B2* | 9/2019 | Okamura | ............... | B62D 21/02 |
| 10,632,827 B2* | 4/2020 | Ajisaka | ................. | B62D 25/08 |
| 2004/0232672 A1 | 11/2004 | Bandoh et al. | | |
| 2010/0089675 A1* | 4/2010 | Nagata | ..................... | B60K 1/04 |
| | | | | 180/68.5 |
| 2013/0140101 A1* | 6/2013 | Lim | ................... | H01M 50/244 |
| | | | | 180/68.5 |
| 2021/0122222 A1* | 4/2021 | Meckenstock | ......... | B62D 25/20 |

FOREIGN PATENT DOCUMENTS

| | | |
|---|---|---|
| JP | 2016-137730 A | 8/2016 |
| JP | 2020-011608 A | 1/2020 |

* cited by examiner

SUPPORT STRUCTURE FOR ON-VEHICLE HIGH VOLTAGE COMPONENT

CROSS REFERENCE TO RELATED APPLICATION

This application claims priority to Japanese Patent Application No. 2022-070729 filed on Apr. 22, 2022, which is incorporated herein by reference in its entirety including the specification, claims, drawings, and abstract.

TECHNICAL FIELD

The present disclosure relates to a support structure for a flat, on-vehicle high voltage component located between seats aligned along the vehicle width direction.

BACKGROUND

An electric vehicle is equipped with a large-capacity battery, and in order to supply power from this battery to various electrical appliances and other devices, an inverter may be installed in a passenger compartment. Inverters have become larger in size in recent years due to the demand for electric vehicles to supply power to household appliances and other devices in the event of a disaster. Such a large inverter can be positioned between seats aligned along the vehicle width direction, for example (for example, see JP 2005-001655 A).

CITATION LIST

PATENT DOCUMENT 1: JP 2005-001655 A

SUMMARY

Here, the inverter is a high voltage component that receives power from a high voltage battery, and it thus needs to be properly installed so as not to be subjected to large loads. In the configuration disclosed in JP 2005-001655 A above where the inverter is positioned between the seats aligned along the vehicle width direction, the inverter may be caught between the seats and receive a large load from the seats during a side impact on the vehicle.

Accordingly, an object of the present disclosure is to provide a support structure for an on-vehicle high voltage component that can prevent, during a side impact on a vehicle, the high voltage component from being caught between seats aligned along the vehicle width direction and receiving a large load from the seats.

A support structure for an on-vehicle high voltage component according to the present disclosure is a support structure for a flat, on-vehicle high voltage component located between seats aligned along the vehicle width direction. In this support structure, a bracket supports the high voltage component in a horizontal position above a floor between the seats in a passenger compartment such that it is spaced apart from the floor. The bracket has a pair of leg portions aligned along the vehicle width direction, and middle parts of the pair of leg portions are formed so as to be easily bent outward or inward in the vehicle width direction. When a load is applied to the bracket due to movement of the seats during a side impact on the vehicle, the pair of leg portions bend, and the horizontal position of the high voltage component is disrupted.

During the side impact on the vehicle, the above configuration allows the pair of leg portions to deform such that, due to the load of the seats, one of the pair of leg portions is further bent and the other of the pair of leg portions becomes straight, thereby disrupting the horizontal position of the high voltage component. The high voltage component thus becomes unlikely to be caught between the seats while it remains in the horizontal position. Due to the tilt, the high voltage component becomes unlikely to receive the large load applied by the seats.

In the support structure for the on-vehicle high voltage component according to some embodiments of the present disclosure, the bracket has a floor portion on which the high voltage component is installed, and that the floor portion has an opening through which a bottom surface of the high voltage component is exposed.

This configuration can improve the heat dissipation performance of the high voltage component.

With the support structure for the on-vehicle high voltage component according to the present disclosure, it is possible to prevent, during a side impact on the vehicle, the high voltage component from being caught between the seats aligned along the vehicle width direction and receiving a large load from the seats.

BRIEF DESCRIPTION OF DRAWINGS

An embodiment of the present disclosure will be described based on the following figures, wherein.

DESCRIPTION OF EMBODIMENT

An example embodiment of the present disclosure will be described in detail hereinafter. In the description below, specific shapes, materials, directions, numerical values, etc. are provided as illustrations for facilitating the understanding of the present disclosure, and can be appropriately changed according to applications, purposes, specifications, etc.

A support structure 10 according to the example embodiment will be described with reference to FIGS. 1 to 4.

The support structure 10 supports a flat inverter 30 that is a high voltage component on a vehicle. During a side impact on the vehicle, the support structure 10 can prevent the inverter 30 from being caught between seats 11L and 11R aligned along the vehicle width direction and receiving a large load from the seats 11L and 11R while the inverter 30 remains in the horizontal position. This will be described in detail below.

The vehicle according to the present embodiment is a plug-in hybrid vehicle that can charge its battery directly from an electrical outlet by using an insertion plug. However, the vehicle is not limited to the plug-in hybrid vehicle, and may also be an electric vehicle or a conventional hybrid vehicle.

The high voltage component according to the present embodiment is the inverter 30 that converts DC current to AC current of any frequency and controls current supplied to a motor for driving. However, the high voltage component is not limited to the inverter 30. The inverter 30 is housed in a housing 31. An airflow fan (not shown) for cooling the inverter 30 is provided on a bottom surface of the housing 31 and blows cooling air downward to cool the inverter 30.

Figure 1:
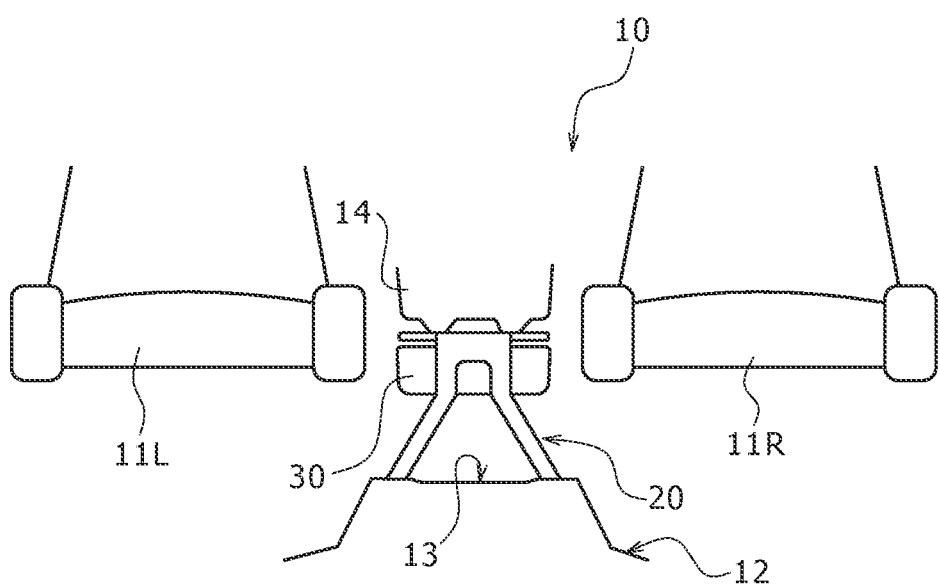
FIG. 1 is a rear view of a support structure according to an example embodiment, as viewed from the rear side in the vehicle front-and-rear direction.

As shown in FIG. 1, in the support structure 10, the inverter 30 is supported by a bracket 20 located between the seats 11L and 11R aligned along the vehicle width direction. Although, in the present embodiment, the seat 11R is the driver's seat, and the seat 11L is the passenger seat, this is not limiting.

In the support structure 10, the inverter 30 is supported in a horizontal position above a floor tunnel 13 of the floor of a vehicle body 12 so as to be spaced apart from the floor tunnel 13. The floor tunnel 13 is a reinforcing member provided, on the floor in the vehicle compartment, at the center in the vehicle width direction so as to extend along the vehicle front-and-rear direction. When the inverter 30 is in a horizontal position, the upper and lower surfaces of the flat inverter 30 are parallel to the floor. In addition, a console box 14 is fixed on the top of the support structure 10.

Figure 2:
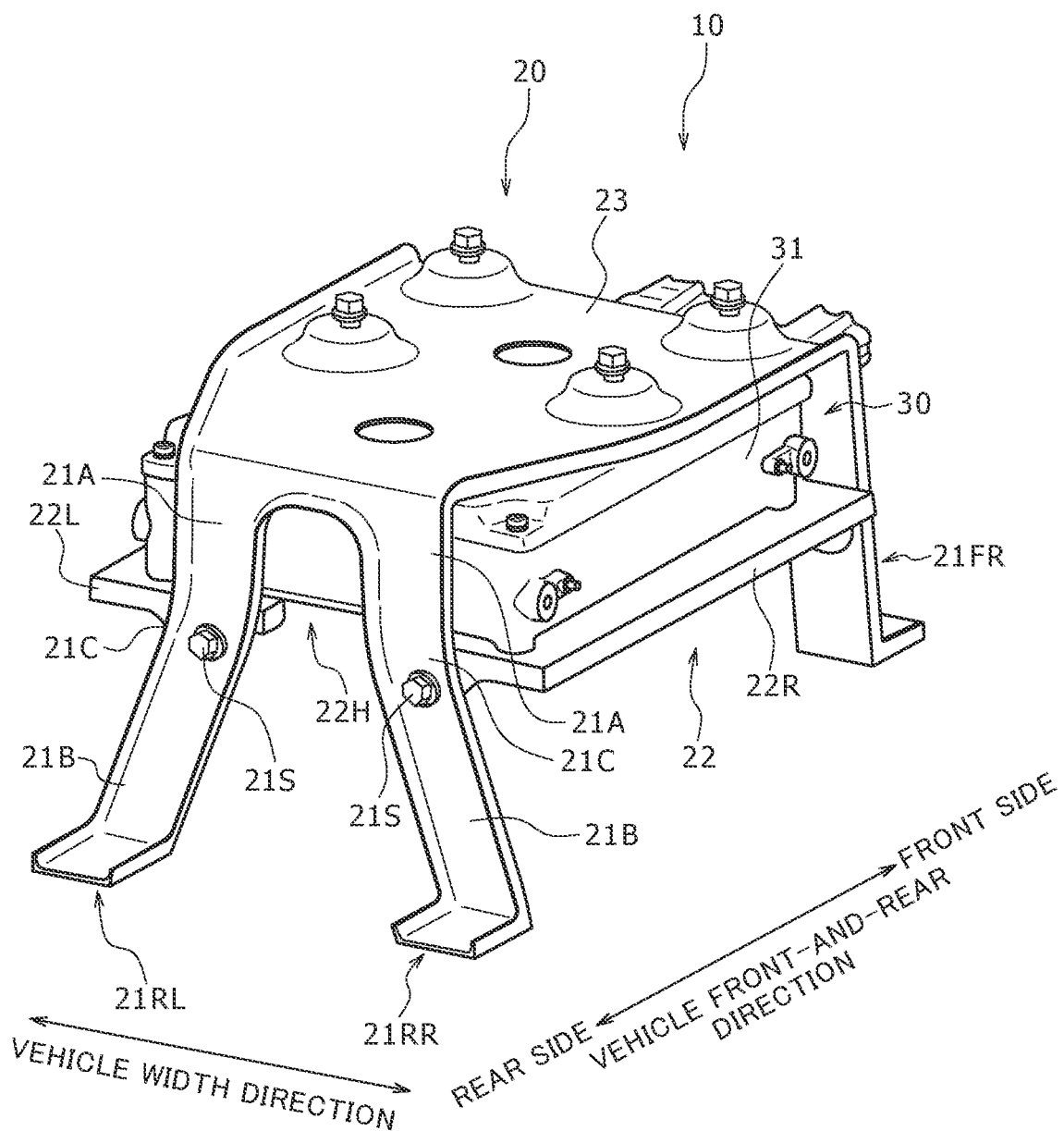
FIG. 2 is a perspective view of the support structure according to the example embodiment, as viewed from a rear oblique direction direction.
Figure 3:
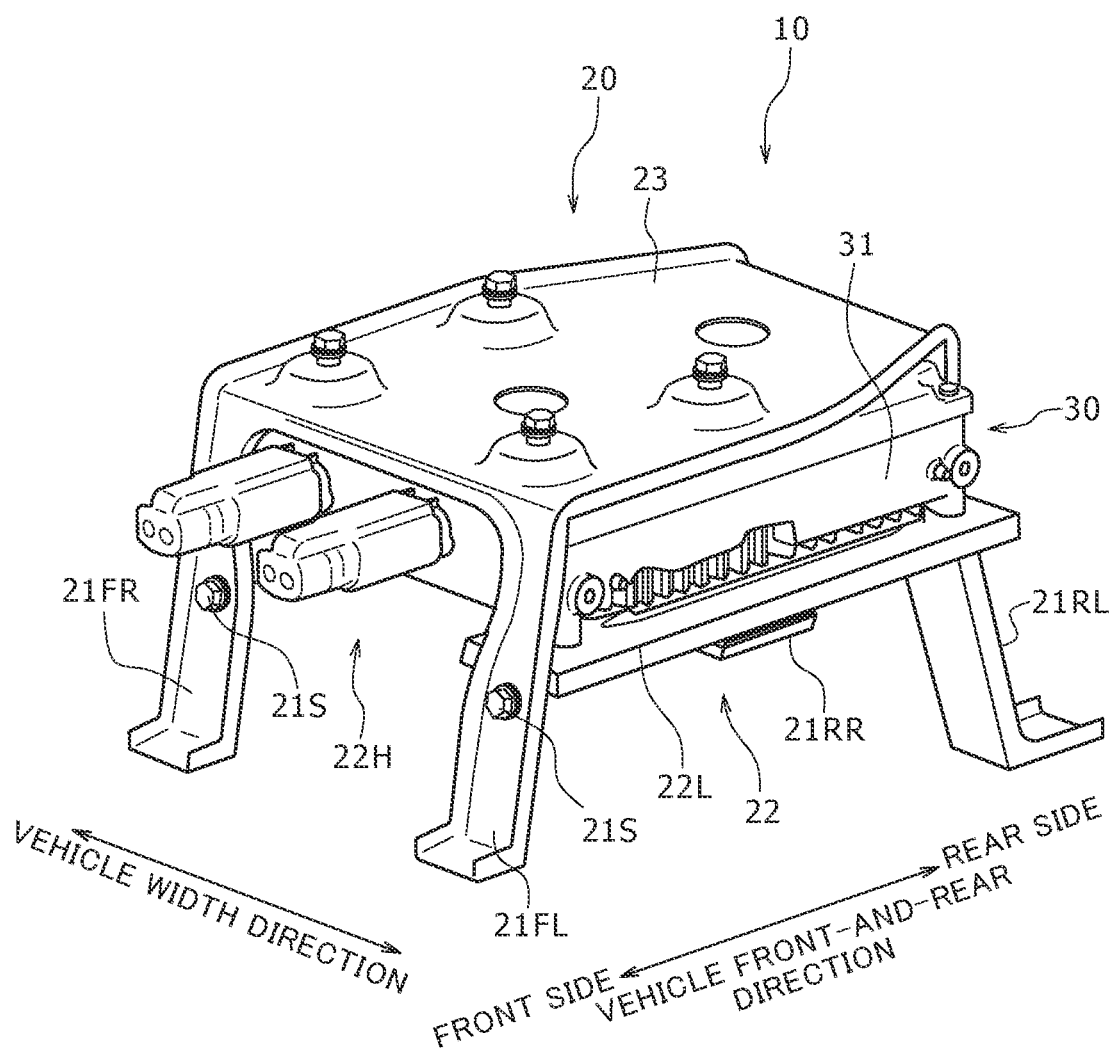
FIG. 3 is another perspective view of the support structure according to the example embodiment, as viewed from a front oblique direction.

As shown in FIGS. 2 and 3, the bracket 20 has leg portions 21 that are fixed to the floor tunnel 13, floor portions 22 on which the inverter 30 is installed, and a top plate portion 23 on which the console box 14 (see FIG. 1) is fixed.

The leg portions 21 are fixed on the floor tunnel 13 as described above and support the inverter 30. The leg portions 21 include a pair of front leg portions 21FL and 21FR arranged along the vehicle width direction at the front end of bracket 20 in the vehicle front-and-rear direction, and a pair of rear leg portions 21RL and 21RR arranged along the vehicle width direction at the rear end of bracket 20.

Middle parts of the pair of rear leg portions 21RL and 21RR are formed so as to be easily bent outward or inward in the vehicle width direction. In the present embodiment, the pair of rear leg portions 21RL and 21RR are bent inward in the vehicle width direction to thereby make them easier to bend outward.

Although, for the bracket 20 according to the present embodiment, the pair of rear leg portions 21RL and 21RR are formed to bend easily, this is not limiting. The pair of front leg portions 21FR and 21FL may be formed to bend easily, or both the pair of rear leg portions 21RL and 21RR and the pair of front leg portions 21FL and 21FR may be formed to bend easily.

Although, in the present embodiment, the pair of rear leg portions 21RL and 21RR are bent inward in the vehicle width direction, this is not limiting. The pair of rear leg portions 21RL and 21RR may be bent outward in the vehicle width direction.

Specifically, the rear leg portion 21RL includes a straight portion 21A extending from the upper side toward the lower side along the vehicle vertical direction, an inclined portion 21B inclined outward in the vehicle width direction relative to the vehicle vertical direction, and a bent portion 21C that is not only a connecting portion between the straight portion 21A and the inclined portion 21B but also is a bent portion of the rear leg portion 21RL. Similarly, the rear leg portion 21RR also has a straight portion 21A, an inclined portion 21B, and a bent portion 21C.

The inverter 30 is supported at the middle parts of the rear leg portions 21RL and 21RR. More specifically, the floor portion 22, on which the inverter 30 is installed (described below), is fixed to support portions 21S provided at the middle parts of the rear leg portions 21RL and 21RR by using fasteners (in this example, bolts). In some embodiments, the support portions 21S are provided near the bent portions 21C, as in the illustrated example. However, the support portion 21S may be provided in the straight portion 21A or the inclined portion 21B other than in the vicinity of the bent portion 21C, so long as it is in the middle part of the rear leg portion 21RL or 21RR.

Figure 4:
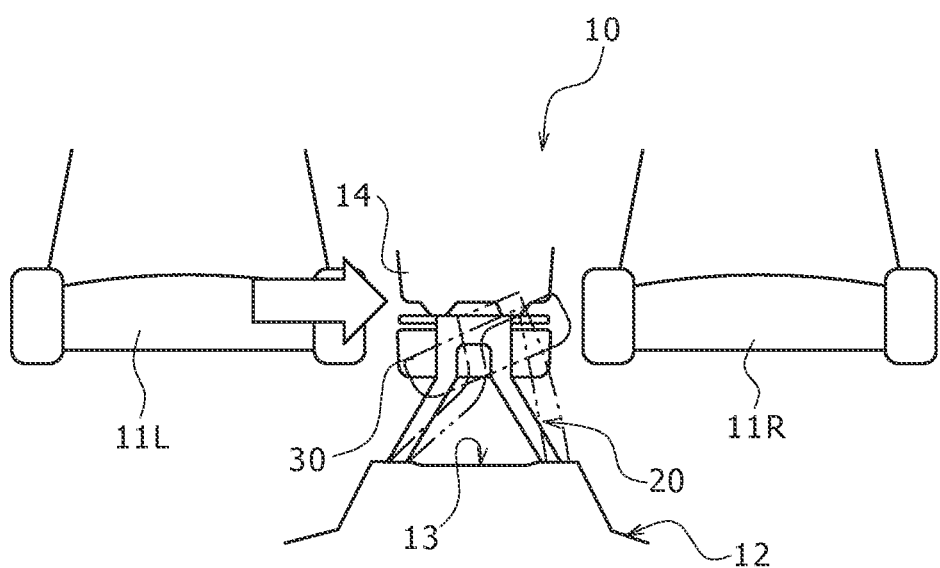
FIG. 4 is a rear view showing an inverter out of balance from its horizontal position during a side impact, as viewed from the rear side in the vehicle front-and-rear direction.

As shown in FIG. 4, for example, when a load is applied to the inverter 30 and the floor portion 22 by the seat 11L during a side impact from the left side of the vehicle, the above configuration allows the bent portions 21C of the rear leg portions 21RL and 21RR to move in the direction of impact, causing the rear leg portion 21RL to deform so as to project further inward (to bend further from its bent shape) and the rear leg portion 21RR to deform from its bent shape to a straight shape.

Such deformation of the rear leg portions 21RL and 21RR pushes the left rear part of the inverter 30 downward and the rear right part of the inverter 30 upward while the inverter 30 is supported by the bracket 20. In other words, the above deformation of the rear leg portions 21RL and 21RR causes the rear part of the inverter 30 to tilt out of balance.

During a side impact on the vehicle, the inverter 30 thus loses balance from its horizontal position supported by the bracket 20 and can avoid being caught between the seats 11R and 11L while it remains in the horizontal position. As a result, the inverter 30 becomes less likely to receive a large load from the seats 11L and 11R.

As such, the bracket 20 has a structure where the pair of rear leg portions 21RL and 21RR are aligned along the vehicle width direction, and the rear leg portions 21RL and 21RR are bent inward in the vehicle width direction to support the inverter 30 at the middle parts of the rear leg portions 21RL and 21RR. With this structure, when a lateral load is applied to the bracket 20, it is possible to deform one of the rear leg portions 21RL and 21RR to bend further and the other to be straight, thereby causing the inverter 30 supported by the bracket 20 to lose its balance from the horizontal position and tilt.

The floor portion 22 is a member which is located at the middle parts of the leg portions 21 and on which the inverter 30 is installed, as described above. The floor portion 22 has an opening 22H to expose the bottom surface of the inverter 30 (the lower surface in the vehicle vertical direction). In some embodiments, in the floor portion 22, the opening 22H is formed by providing a predetermined space between a left floor portion 22L located on the left side in the vehicle width direction and a right floor portion 22R located on the right side, as in the illustrated example. However, the opening 22H may be an opening that is formed in the floor portion 22.

As cooling air is blown downward to cool the inverter 31, the above configuration allows the space below the floor portion 22 of the bracket 20 to be used as a ventilation path for cooling air for the inverter 30. This improves heat the dissipation performance of the inverter 30.

The left floor portion 22L is formed in an elongated shape along the vehicle front-and-rear direction and is fixed to the middle parts of the front leg portion 21FL and the rear leg portion 21RL in the vehicle vertical direction by bolts. The right floor portion 22R is formed in an elongated shape along the vehicle front-and-rear direction and is fixed to the middle parts of the front leg portion 21FR and the rear leg portion 21RR in the vehicle vertical direction by bolts.

The top plate portion 23 is a flat plate member that forms a top plate of the bracket 20 and is fixed to the console box 14 as described above. The front leg portions 21FL and 21FR are respectively connected to the left and right ends of the top plate portion 23 in the vehicle width direction at the front end of the top plate portion 23 in the vehicle front-and-rear direction. The rear leg portions 21RL and 21RR are respectively connected to the left and right ends of the top plate portion 23 in the vehicle width direction at the rear end of the top plate portion 23 in the vehicle front-and-rear direction. For the bracket 20 according to the present embodiment, the top plate 23, the front leg portions 21FL and 21FR, and the rear leg portions 21RL and 21RR are integrally formed and bent.

The top plate portion 23 is fixed to the bottom surface of the console box 14 by using fasteners (in the present embodiment, bolts).

The present disclosure is not limited to the above embodiment and its variations, and, as a matter of course, various modifications and improvements can be made without departing from the scope of the claims herein.

The invention claimed is:

1. A support structure for a flat, on-vehicle high voltage component located between seats aligned along a vehicle width direction, wherein
   a bracket supports the high voltage component in a horizontal position above a floor between the seats in a passenger compartment so as to be spaced apart from the floor,
   the bracket has a top plate portion, and a pair of leg portions aligned along the vehicle width direction, each of the pair of leg portions has a straight portion, an inclined portion, and a bent portion, the straight portions extend from the top plate portion in a vehicle vertical direction, the inclined portions incline outwardly in the vehicle width direction, and the bent portions connect the straight portions and the inclined portions and bend each of the pair of leg portions,
   the bent portions of the pair of leg portions are formed to be easily bent outward or inward in the vehicle width direction, and
   when a load is applied to the bracket due to movement of the seats during a side impact on the vehicle, the pair of leg portions bend, and the horizontal position of the high voltage component is disrupted,
   wherein the bracket has a floor portion on which the high voltage component is installed,
   wherein the floor portion has a right floor portion located on a right side in the vehicle width direction, a left floor portion on a left side in the vehicle width direction, and an opening through which a bottom surface of the high voltage component is exposed, the opening is formed by providing a predetermined space between the right floor portion and the left floor portion, the left floor portion and the right floor portion are fixed to the bent portions of the pair of leg portions,
   wherein the bracket includes a pair of front leg portions arranged along the vehicle width direction at a front end of the top plate portion of the bracket in a vehicle front-and-rear direction, a front end of the right floor portion and a front end of the left floor portion are fixed to middle portions of the front leg portions,
   wherein the pair of leg portions are arranged along the vehicle width direction at a rear end of the top plate portion of the bracket in the vehicle front-and-rear direction, a rear end of the right floor portion and a rear end of the left floor portion are fixed to the bent portions of the pair of leg portions, and
   wherein the top plate portion is located above the floor portion in the vehicle vertical direction such that the high voltage component is installed between the top plate portion and the floor portion in the vehicle vertical direction.

* * * * *